(12) United States Patent
Takeda et al.

(10) Patent No.: US 12,504,368 B2
(45) Date of Patent: Dec. 23, 2025

(54) LASER GAS ANALYZER (71) Applicant: FUJI ELECTRIC CO., LTD., Kawasaki (JP)

(72) Inventors: Naoki Takeda, Kawasaki (JP); Ikumi Yoshimine, Kawasaki (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 89 days.

(21) Appl. No.: 18/161,599

(22) Filed: Jan. 30, 2023

(65) Prior Publication Data

US 2023/0288328 A1    Sep. 14, 2023

(30) Foreign Application Priority Data

Mar. 11, 2022   (JP) .................................. 2022-037788

(51) Int. Cl.
*G01N 21/39* (2006.01)
*G01N 33/00* (2006.01)

(52) U.S. Cl.
CPC ......... *G01N 21/39* (2013.01); *G01N 33/0062* (2013.01); *G01N 33/0073* (2013.01); *G01N 2021/391* (2013.01)

(58) Field of Classification Search
CPC ............. G01N 21/39; G01N 2021/399; G01N 21/3504; G01N 21/359; G01N 21/85; G01N 21/01; G01N 21/3103; G01N 21/3151; G01N 2201/0612; G01N 2021/391; G01N 33/0062; G01N 33/0073;

(Continued)

(56) References Cited

U.S. PATENT DOCUMENTS 6,961,092 B1    11/2005   Kakiuchi et al.
2014/0022542 A1*  1/2014   Otera .................... G01J 3/42
                                                 356/300

(Continued)

FOREIGN PATENT DOCUMENTS

CN    101646934 A  *  2/2010   ............. G01N 21/39
DE    102018218684 A1 *  6/2019  ............. G01J 3/0262

(Continued)

OTHER PUBLICATIONS

French Search Report dated Jun. 11, 2024, in the counterpart French Patent Application No. 2300780.

(Continued)

*Primary Examiner* — Michael P Stafira
(74) *Attorney, Agent, or Firm* — Rabin & Berdo, P.C.

(57) ABSTRACT

A laser gas analyzer includes a light emitting unit including a laser element configured to emit laser light having a target wavelength band including a wavelength of an absorption line spectrum of the target gas, and a modulated light generation unit configured to supply a drive current to the laser element so that the laser element sweeps and modulates the laser light to have the target wavelength band, and a light receiving unit including a light receiving element configured to receive the laser light passing through the target space and output a detection signal, and a light reception signal processing unit configured to analyze the target gas according to the detection signal from the light receiving element. The light emitting unit and the light receiving unit communicate with each other using the laser light.

4 Claims, 5 Drawing Sheets (58) Field of Classification Search
CPC ... G01N 2201/0691; G01N 2021/0112; G01N 2021/151; G01N 2021/8521; G01N 2021/8578; G01N 21/15; G01N 21/31; G01N 21/61; G01N 21/8507; G01N 2201/06113; G01N 2201/062; G01N 2201/064; G01N 33/0027
See application file for complete search history.

(56) References Cited

U.S. PATENT DOCUMENTS

2014/0185006 A1* 7/2014 Yonezawa ............ A61B 3/1025
    351/246
2020/0363265 A1  11/2020 Okada et al.

FOREIGN PATENT DOCUMENTS

| EP | 2944945 B1 * | 2/2021 | ......... G01N 21/3103 |
| JP | 201112026 A | 4/2001 | |
| JP | 2011117868 A | 6/2011 | |
| JP | 2013117517 A * | 6/2013 | |
| JP | 2013127385 A * | 6/2013 | |
| JP | 2014102140 A * | 6/2014 | |
| JP | 2015129769 A * | 7/2015 | ......... G01N 21/3103 |
| JP | 2017083233 A * | 5/2017 | ............. G01J 3/427 |
| JP | 2017106742 A * | 6/2017 | |
| JP | 2020052033 A | 4/2020 | |
| JP | 2020115118 A | 7/2020 | |
| JP | 2021036938 A | 3/2021 | |
| JP | 2021139868 A | 9/2021 | |
| WO | WO-2014162536 A1 * | 10/2014 | ............. G01N 21/39 |

OTHER PUBLICATIONS

Indian Office Action dated Jun. 19, 2024, in the counterpart Indian patent application No. 202344006153.
Japanese Office Action issued for corresponding Japanese Patent Application No. 2022-037788 dated Sep. 2, 2025.

* cited by examiner

LASER GAS ANALYZER

CROSS REFERENCE TO RELATED APPLICATIONS

This application is based upon and claims the benefit of priority of the prior Japanese Patent Application No. 2022-037788, filed on Mar. 11, 2022, the entire contents of which are incorporated herein by reference.

BACKGROUND OF THE INVENTION

Field of the Invention

The present invention relates to a laser gas analyzer that analyzes the presence or absence and the concentration of various kinds of gas to be measured in a space.

Description of the Related Art

A laser gas analyzer uses a laser element of a light emitting unit to emit laser light of a light absorption wavelength at which the laser light is absorbed by a gas to be measured, which is made up of gaseous gas molecules, causing the gas to be measured to absorb the laser light, and performs a gas analysis of the gas to be measured by the light receiving unit based on the amount of absorption of the laser light at the light absorption wavelength.

As described in Japanese Patent Laid-Open No. 2017-106742 (Patent Literature 1), for example, wavelength modulation spectroscopy is generally used for a gas analysis of the gas to be measured. That is, according to Patent Literature 1, laser light that has a wavelength swept by a drive current and that is modulated at a specific frequency is emitted by a wavelength variable laser light source, the laser light is detected by a photodetector, and a lock-in amplifier lock-in detects a signal with a frequency that is the integral multiple of the modulated frequency. Based on correspondence (proportional relationship or the like) between the gas concentration of the gas to be measured and the amplitude of the lock-in detection waveform, it is possible to perform an arithmetic operation for the concentration of the gas.

The light emitting unit and the light receiving unit are connected with each other by a communication line for synchronization of signals or for exchanging set values. However, at an actual installation site, there may be the case where the diameter of a flue is several meters. For this reason, an extremely long cable is required for the communication line that connects the light emitting unit and the light receiving unit with each other. Further, the laser gas analyzer is installed outdoors and hence, it is necessary to eliminate the influence of surge or an indirect lightning stroke. Therefore, an insulated communication module is mounted on each of the light emitting unit and the light receiving unit that form the laser gas analyzer, and these modules occupy a relatively large area even for simple serial communication. As a result, it is difficult to reduce the size of the laser gas analyzer. An increase in the size of the laser gas analyzer also causes a problem in explosion proofing proportional to the volume of the laser gas analyzer, for example.

The present invention, which has been made to solve the above-mentioned problem, provides a laser gas analyzer that can exchange required information between the light emitting unit and the light receiving unit without connecting the light emitting unit and the light receiving unit by the communication line.

SUMMARY OF THE INVENTION

The present invention is directed to a laser gas analyzer that performs a gas analysis of a gas to be measured that is present in a space to be measured, the laser gas analyzer including: a light emitting unit including a laser element configured to emit laser light in a wavelength band that includes a light absorption wavelength of an absorption line spectrum of the gas to be measured, and a modulated light generation unit configured to supply a drive current to the laser element such that a wavelength of the drive current is swept and modulated in the wavelength band that includes the light absorption wavelength of the absorption line spectrum of the gas to be measured; and a light receiving unit including a light receiving element configured to receive the laser light that passes through the space to be measured, and a light reception signal processing unit configured to analyze the gas to be measured based on a detection signal outputted from the light receiving element, wherein communication between the light emitting unit and the light receiving unit is performed through the laser light.

One aspect of the present invention is characterized in that the light emitting unit generates, by the modulated light generation unit, information on the light emitting unit in a form of a light modulation signal, the information being required by the light receiving unit, and superimposes the light modulation signal on the laser light, and the light reception signal processing unit obtains a light modulation signal for gas analysis and a light modulation signal for communication from a detection signal outputted from the light receiving element.

One aspect of the present invention is characterized in that the information on the light emitting unit is a measurement start timing at which the gas analysis is performed, the information being required by the light receiving unit.

One aspect of the present invention is characterized in that the light emitting unit digital-analog converts the light modulation signal for gas analysis and the light modulation signal for communication, which are generated by the modulated light generation unit, and the light emitting unit superimposes the light modulation signal for gas analysis and the light modulation signal for communication on the laser light.

One aspect of the present invention is characterized in that the light reception signal processing unit analog-digital convers the detection signal outputted from the light receiving element to obtain the light modulation signal for gas analysis and the light modulation signal for communication.

According to the present invention, it is possible to perform communication for exchanging various communication information without through the communication line, so that it becomes unnecessary to connect the light emitting unit and the light receiving unit by the communication line. Accordingly, it is possible to provide a laser gas analyzer that can achieve a simplification of the handing of wiring or the like performed by a worker and a reduction in size.

DETAILED DESCRIPTION OF THE PREFERRED EMBODIMENT

Hereinafter, a laser gas analyzer according to an embodiment of the present invention will be described in detail with reference to attached drawings. The present invention is not limited to the following embodiments, and can be carried out by suitably modifying without departing from the gist of the present invention.

<Diagram of Overall Configuration of Laser Gas Analyzer>

Figure 1:
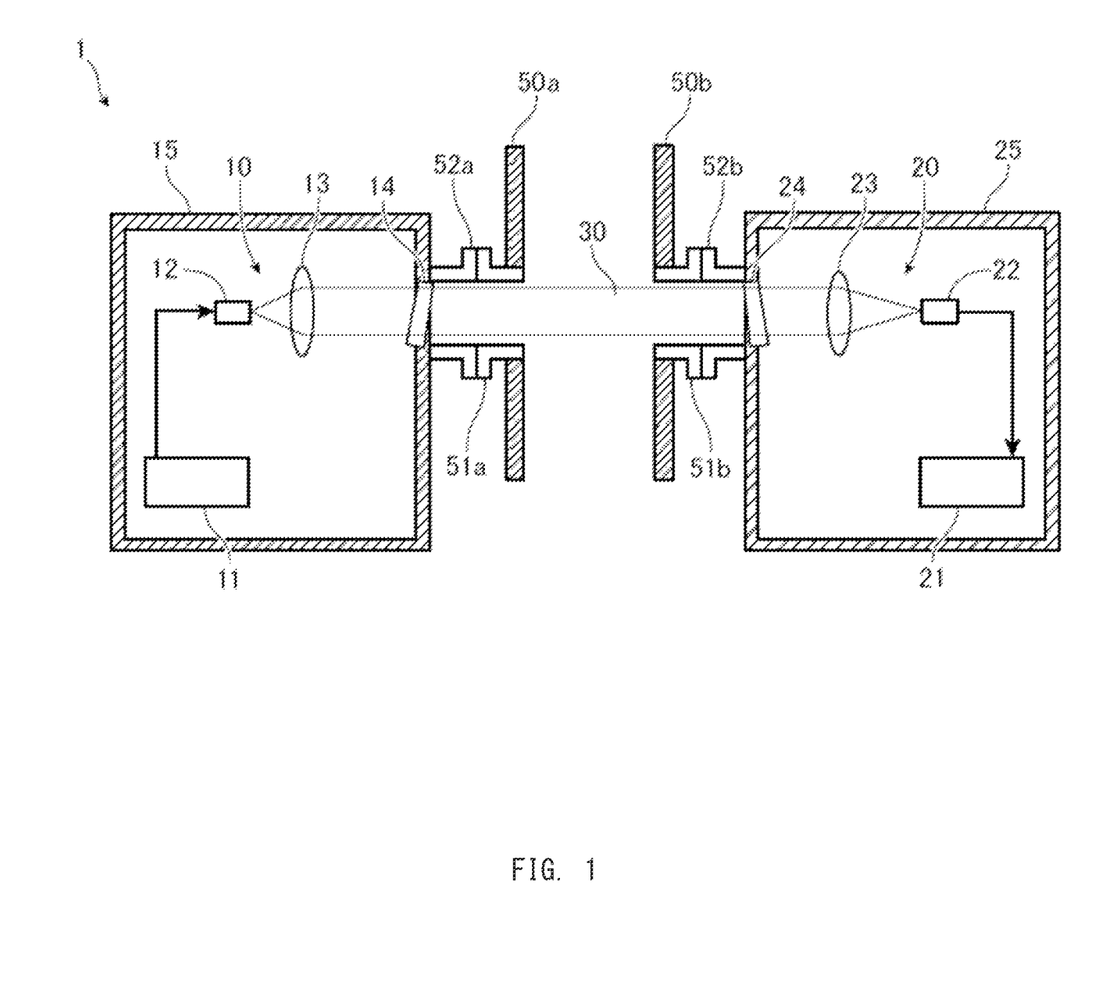
FIG. 1 is a diagram of the overall configuration of a laser gas analyzer according to this embodiment.

FIG. 1 is a diagram of the overall configuration of a laser gas analyzer according to an embodiment of the present invention. As shown in FIG. 1, a laser gas analyzer 1 includes a light emitting unit 10 and a light receiving unit 20.

The laser gas analyzer 1 analyzes a gas to be measured (target gas) that is present in a space to be measured (target space). In the laser gas analyzer 1, the gas to be measured that flows through a space inside walls 50a, 50b (a space to be measured) is irradiated with a laser light 30 emitted from the light emitting unit 10, the walls 50a, 50b forming a gas pipe. The laser light 30 that transmits through the gas to be measured is incident on the light receiving unit 20, so that it is possible to obtain the concentration of a specific gas based on the amount of detected light. Further, when the concentration of the gas is zero or equal to or less than a predetermined value, it is possible to detect that the gas is not present. Accordingly, it is also possible to detect the presence or absence of the gas.

The light emitting unit 10 and the light receiving unit 20 are detachably attached to the walls 50a, 50b forming the gas pipe. The walls 50a, 50b are the walls of pipes or the like in which a specific gas is present, and each of the walls 50a, 50b has a hole. Flanges 51a, 51b are fixed to these holes by welding or the like. Optical axis adjustment flanges 52a, 52b, provided to the light emitting unit 10 and the light receiving unit 20, are mechanically detachably attached to these flanges 51a, 51b. The light emitting unit 10 and the light receiving unit 20 are disposed at positions that face each other with the walls 50a, 50b interposed therebetween. However, the positions of the light emitting unit 10 and the light receiving unit 20 can be adjusted by the optical axis adjustment flanges 52a, 52b.

The optical axis adjustment flange 52a can adjust the emission angle of the laser light 30. The optical axis adjustment flange 52b can adjust the incident angle of the laser light 30. Due to the optical axis adjustment flanges 52a, 52b, a maximum amount of the laser light 30 emitted from the light emitting unit 10 is received by the light receiving unit 20.

[Light Emitting Unit 10]

The light emitting unit 10 will be described. As shown in FIG. 1, the light emitting unit 10 is configured to include a modulated light generation unit 11, a laser element 12, a collimating lens 13, a light emitting unit window plate 14, a light emitting unit container 15, and the optical axis adjustment flange 52a. As shown in FIG. 1, the modulated light generation unit 11, the laser element 12, and the collimating lens 13 are disposed in the light emitting unit container 15. The light emitting unit container 15 isolates the respective components incorporated in the light emitting unit container 15 from outside air, thus protecting the respective components from wind and rain, dust and dirt, contamination, or the like.

The modulated light generation unit 11 generates a drive current that is generated such that the wavelength of the drive current is repeatedly swept and modulated in a wavelength band that includes the light absorption wavelength of the absorption line spectrum of the gas to be measured. The modulated light generation unit 11 supplies, to the laser element 12, the drive current for emitting modulated laser light. With such a configuration, to analyze the concentration of a gas, it is possible to perform irradiation with wavelength-modulated modulated light corresponding to light absorption characteristic of the gas to be measured.

The laser element 12 emits light at a center wavelength $\lambda 1$ of a specific absorption line spectrum and wavelengths around the center wavelength, the gas to be measured absorbing the light. The laser element 12 variably controls an emission wavelength by controlling a drive current and a temperature.

The laser element 12 is temperature-controlled such that an emission center wavelength takes the center wavelength $\lambda 1$ of the absorption line spectrum of the gas to be measured. Further, the laser light 30 emitted from the laser element 12 is controlled such that wavelengths around the center wavelength of the absorption line spectrum of the gas to be measured are swept in terms of time by the drive current supplied from the modulated light generation unit 11. Further, the laser light 30 is modulated by superimposing an appropriate sine wave so as to allow measurement with high sensitivity by wavelength modulation spectroscopy (WMS). Wavelength modulation spectroscopy is also referred to as 2f detection.

The laser element 12 to be used is not particularly limited. However, the laser element 12 may be a DFB laser diode (Distributed Feedback Laser Diode), a VCSEL (Vertical Cavity Surface Emitting Laser), or a DBR laser diode (Distributed Bragg Reflector Laser Diode), for example.

The collimating lens 13 is made of a material having high transmittance at the center wavelength $\lambda 1$ of the absorption line spectrum of the gas to be measured and at wavelengths around the center wavelength $\lambda 1$. The laser light 30 is converted to substantially parallel light by the collimating lens 13, and can be transmitted to the light receiving unit 20 while loss caused by diffusion is suppressed.

The light emitting point of the laser element 12 is disposed at a position in the vicinity of the focal point of the collimating lens 13. The light emitted from the laser element 12 is incident on the collimating lens 13 while diffusing, thus being converted to the laser light 30, which is substantially parallel light. In the present embodiment, the description is made assuming that the collimating lens 13 is used as a parallel light conversion unit. However, it should not be construed that the parallel light conversion unit is limited to a collimating lens. For example, it is also possible to use a parabolic mirror as the parallel light conversion unit in place of the collimating lens 13.

The laser light 30, which is substantially parallel light, transmits through the light emitting unit window plate 14, and propagates through a space inside the walls 50a, 50b, that is, a space in which gases including the gas to be measured are present. A hole is formed at a portion of the light emitting unit container 15, and the light emitting unit window plate 14 is provided to close this hole. The light emitting unit window plate 14 is disposed in the optical path of the laser light 30, and prevents the gases including the specific gas to be measured from intruding into the light emitting unit 10 while allowing the laser light 30 to transmit through the light emitting unit window plate 14. With such a configuration, the respective components disposed in the light emitting unit container 15 are prevented from directly coming into contact with the gas and hence, it is possible to protect the respective components in the light emitting unit container 15.

[Light Receiving Unit 20]

The light receiving unit 20 will be described. The light receiving unit 20 is configured to include a light reception signal processing unit 21, a light receiving element 22, a condenser lens 23, a light receiving unit window plate 24, and a light receiving unit container 25. The light receiving unit container 25 incorporates the light receiving element 22, optical components, and an electrical and electronic circuit therein. The light receiving unit container 25 isolates these components from outside air, thus protecting these components from wind and rain, dust and dirt, contamination, or the like.

The light receiving unit 20 receives the laser light 30 that transmits through the light receiving unit window plate 24, and analyzes light that is absorbed by the gas to be measured due to light absorption characteristic of the gas to be measured. A hole is formed at a portion of the light receiving unit container 25, and the light receiving unit window plate 24 is provided to close this hole. The light receiving unit window plate 24 is disposed in the optical path of the laser light 30, and prevents the gases including the specific gas to be measured from intruding into the light receiving unit 20 while allowing the laser light 30 to transmit through the light receiving unit window plate 24. With such a configuration, the respective components disposed in the light receiving unit 20 are prevented from directly coming into contact with the gas and hence, it is possible to protect the respective components in the light receiving unit 20. The laser light 30 is condensed by the condenser lens 23, and is incident on the light receiving element 22. In the present embodiment, the condenser lens 23 is used. However, it is also possible to adopt a parabolic mirror, a doublet lens, a diffractive lens, or the like in place of the condenser lens 23.

The light receiving element 22 receives the laser light 30 that passes through the gas to be measured. For the light receiving element 22, it is possible to select a light receiving element having sensitivity to the center wavelength $\lambda 1$ of the absorption line spectrum of the gas to be measured and to wavelengths around the center wavelength $\lambda 1$. A light reception signal outputted from the light receiving element 22 is transmitted to the light reception signal processing unit 21 as an electric signal.

The condenser lens 23 is made of a material having high transmittance at the center wavelength $\lambda 1$ of the absorption line spectrum of the gas to be measured and at wavelengths around the center wavelength $\lambda 1$. The laser light 30 is caused to be condensed on the light receiving element 22 by the condenser lens 23 and hence, it is possible to obtain high signal intensity.

The light reception signal processing unit 21 performs processing on the electric signal received by the light receiving element 22 to calculate the concentration of the gas. The harmonic of the modulated frequency of the wavelength-modulated laser light 30 is lock-in detected, and amplitude information for the detected waveform is calculated and hence, it is possible to detect the gas with high sensitivity.

In the case where a plurality of gases that are present in the space to be measured have a fixed composition, the amplitude of a lock-in detection wavelength obtained by absorption of light by the gas to be measured is a function of the wavelength modulation amplitude, and has a maximum value. Accordingly, in calibrating a standard gas, it is possible to maximize a signal-to-noise ratio by adjusting the wavelength modulation amplitude such that the amplitude of a lock-in detection waveform takes a maximum value.

Figure 2:
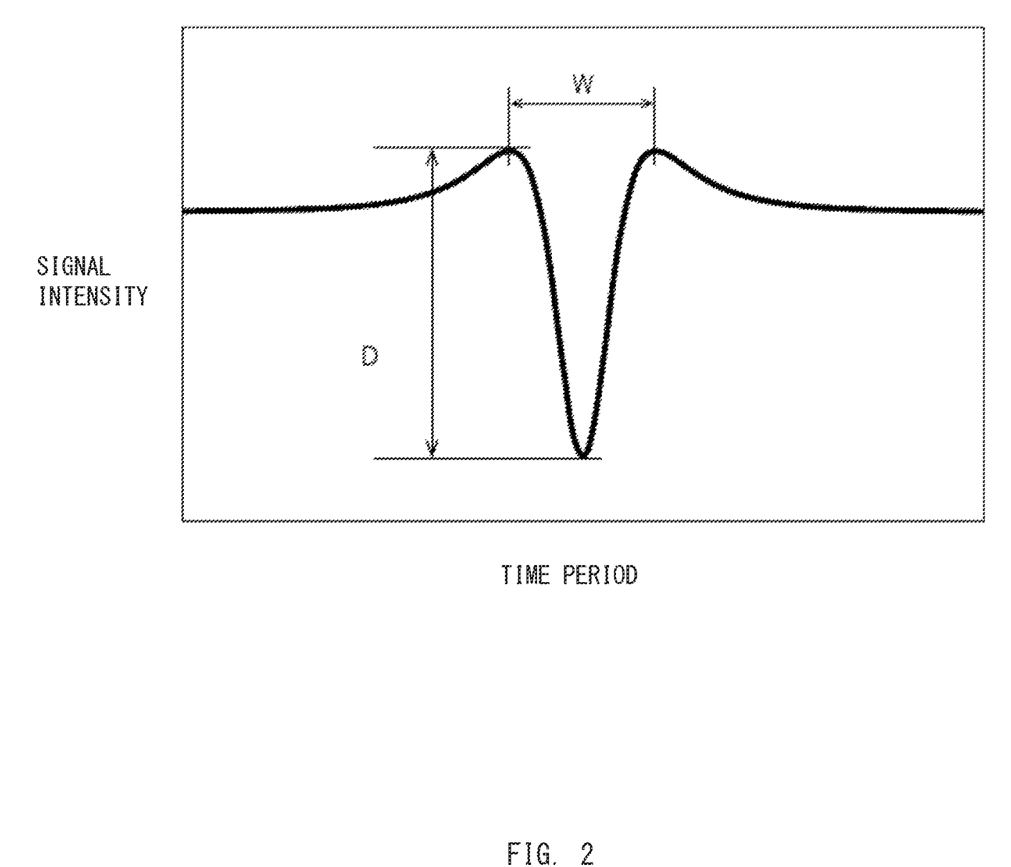
FIG. 2 is a diagram of the waveform of a lock-in detection signal.

FIG. 2 is a diagram of the waveform of a lock-in detection signal. As shown in FIG. 2, the lock-in detection signal has a waveform having extreme values based on the absorption line of the component of the gas to be measured. The range with a width W shows the lock-in detection signal caused by absorption by the gas.

A difference D in signal intensity of the lock-in detection signal shown in FIG. 2 between the bottom and the peak has a correlation with the concentration of the gas. Accordingly, by performing calibration with a standard gas set to each concentration in advance, it is possible to measure the concentration of the gas by detecting the difference D.

The width W of the lock-in detection signal can be used for performing an arithmetic operation for correction according to the kind of gas, for example.

Description of Block Forming Laser Gas Analyzer of Present Embodiment

Figure 3:
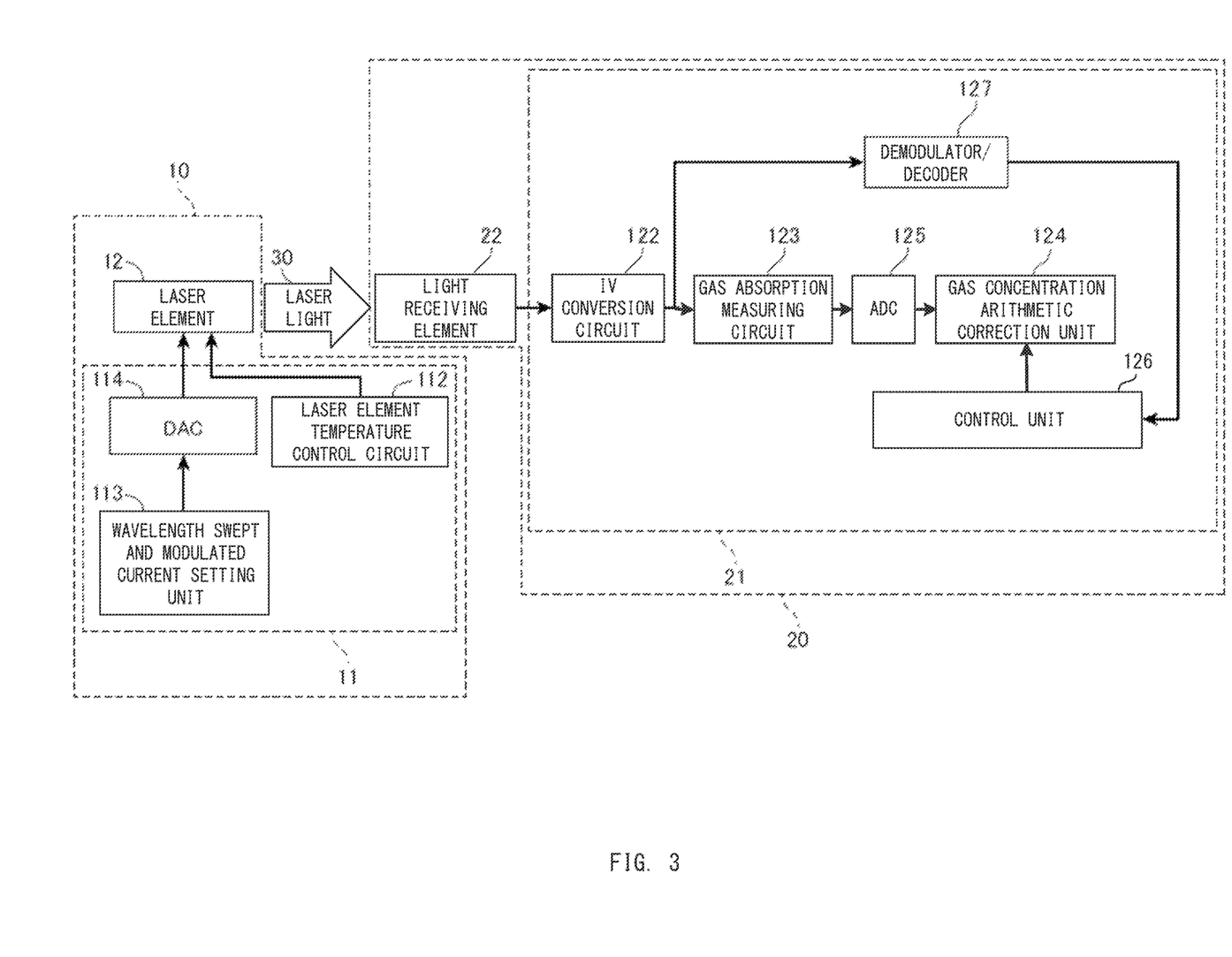
FIG. 3 is a diagram of a signal processing block of the laser gas analyzer according to this embodiment.

FIG. 3 is a diagram of the signal processing block of the laser gas analyzer according to this embodiment. Signal processing performed by the laser gas analyzer according to the present embodiment will be described with reference to FIG. 3. Of the light emitting unit 10 and the light receiving unit 20 of the laser gas analyzer 1 shown in FIG. 1, the modulated light generation unit 11 and the light reception signal processing unit 21 will be described particularly in detail with reference to the diagram of the block shown in FIG. 3. Even when components that the laser gas analyzer 1 usually includes are not shown in FIG. 3, it is assumed that such components are included.

As shown in FIG. 3, the light emitting unit 10 is configured to include the laser element 12 and the modulated light generation unit 11, and the modulated light generation unit 11 is configured to include a laser element temperature control circuit 112, a wavelength swept and modulated current setting unit 113, and a DA converter 114.

The wavelength swept and modulated current setting unit 113 controls a drive current for the laser element 12 such that the wavelength of the laser light 30 emitted from the laser element 12 is swept in the vicinity of an absorption line at the center wavelength $\lambda 1$ of the absorption line spectrum of the gas to be measured and is modulated by a predetermined signal. Further, as will be described later, the wavelength swept and modulated current setting unit 113 generates information on the light emitting unit 10 in the form of a light modulation signal, the information on the light emitting unit 10 being required by the light receiving unit 20.

The DA converter 114 converts a digital signal to an analog signal. The DA converter 114 DA converts a light modulation signal transmitted from the wavelength swept and modulated current setting unit 113, and transmits the light modulation signal to the laser element 12.

The laser element temperature control circuit 112 controls an output from the laser element 12 and a wavelength to fixed values, thus stabilizing the output from the laser element 12 and the wavelength. The output from the laser element 12 and the wavelength fluctuate depending on a temperature. Therefore, to prevent an output and a wavelength from fluctuating due to a change in ambient temperature, the laser element 12 is controlled to a fixed temperature by the laser element temperature control circuit 112.

The light receiving unit 20 is configured to include the light receiving element 22 and the light reception signal processing unit 21, and the light reception signal processing unit 21 is configured to include an IV conversion circuit 122, a gas absorption measuring circuit 123, an AD converter 125, a gas concentration arithmetic correction unit 124, a demodulator/decoder 127, and a control unit 126.

The light receiving element 22 is an element having sensitivity to the wavelength of the laser light 30. For the light receiving element 22, it is possible to suitably select a photodiode, for example, according to the wavelength of the laser light 30 or intensity of a signal.

The IV conversion circuit 122 is a circuit that converts a current signal outputted from the light receiving element 22 to a voltage signal. For example, when the light receiving element 22 is a photodiode, it is possible to select a transimpedance amplifier that amplifies a current signal outputted from the photodiode while converting the current signal to a voltage signal. In this case, under the condition that the laser light 30 is least attenuated, that is, under the condition that there is no dust or the like in the optical path, a signal may be suitably amplified by an amplifier circuit not shown in the drawing to an extent that the signal is not saturated.

The gas absorption measuring circuit 123 performs various kinds of processing for measuring gas absorption. Although not shown in the drawing, the gas absorption measuring circuit 123 is provided with various kinds of filters, an amplifier circuit, and a lock-in detection unit, for example. In lock-in detection, phase detection is performed at a frequency that is an integral multiple (two times, for example) of the modulated frequency included in the detection signal outputted from the light receiving element 22, the modulated frequency being set in the wavelength swept and modulated current setting unit 113. The lock-in detected lock-in detection signal is transmitted to the AD converter 125, and is analog-digital converted. The gas concentration arithmetic correction unit 124 performs arithmetic operation for the concentration of the gas based on correspondence (proportional relationship or the like) between the gas concentration of the gas to be measured and the amplitude of the lock-in detection waveform. In FIG. 3, the AD converter 125 is connected to the downstream of the gas absorption measuring circuit 123. However, the AD converter 125 may be connected to the upstream of the gas absorption measuring circuit 123.

The gas absorption measuring circuit 123 can extract a light modulation signal for gas analysis and a light modulation signal for communication from the detection signal outputted from the light receiving element 22. Of these signals, the light modulation signal for gas analysis is subjected to gas analysis in the above-mentioned lock-in detection. In contrast, as will be described later, the light modulation signal for communication is a synchronizing signal for a measurement start timing in the gas analysis, for example.

The demodulator/decoder 127 demodulates/decodes a signal of communication information into a form that can correspond with the analyzer of the present embodiment.

The control unit 126 controls the respective processing units (the gas absorption measuring circuit 123, the gas concentration arithmetic correction unit 124) of the light receiving unit 20. The control unit 126 can control the respective processing units based on information on the gas to be measured and the communication information transmitted from the light emitting unit 10.

Process to Achieve Present Embodiment

Figure 4:
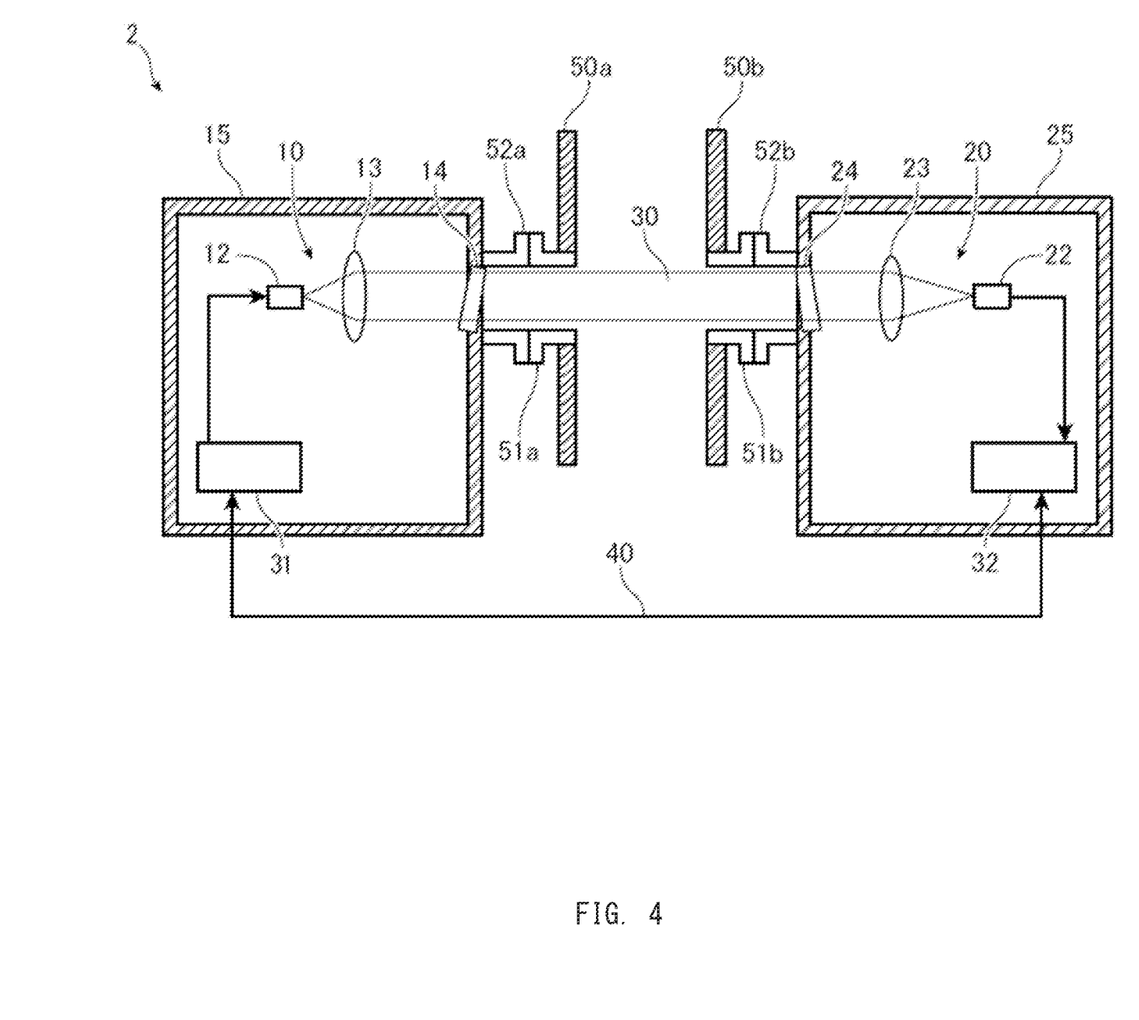
FIG. 4 is a diagram of the overall configuration of a conventional laser gas analyzer.

FIG. 4 is a diagram showing the overall configuration of a conventional laser gas analyzer 2. In the conventional configuration shown in FIG. 4, various communication information, such as synchronization of a concentration measurement start timing, is exchanged between the light emitting unit 10 and the light receiving unit 20 through the communication line 40.

As shown in FIG. 4, the communication line 40 connects a modulated light generation unit 31 and a light reception signal processing unit 32 with each other. In the conventional configuration, the communication line 40, the modulated light generation unit 31, and the light reception signal processing unit 32 are formed based on Patent Literature 1, for example.

As described above, in the conventional configuration, the light emitting unit 10 and the light receiving unit 20 are connected with each other by the communication line 40 for synchronization of signals or for exchanging set values. However, the conventional configuration causes an increase in the size of the laser gas analyzer 2, and has a problem that the handing of wiring becomes complicated, for example.

In view of the above, in the laser gas analyzer 1 of the present embodiment, as shown in FIG. 1, communication between the light emitting unit 10 and the light receiving unit 20 is performed through the laser light 30 without using the communication line 40 between the light emitting unit 10 and the light receiving unit 20. As described above, in the present embodiment, it is unnecessary to connect the light emitting unit 10 and the light receiving unit 20 by the communication line 40 and hence, the handing of wiring or the like performed by a worker is simplified, and it is also possible to achieve a reduction in the size of the laser gas analyzer 1.

<Communication Between Light Emitting Unit 10 and Light Receiving Unit 20>

In the laser gas analyzer 1 of the present embodiment, a communication signal between the light emitting unit 10 and the light receiving unit 20 can be generated by the wavelength swept and modulated current setting unit 113 shown in FIG. 3 in the form of a light modulation signal. It is preferable that the communication signal be information on the light emitting unit 10, the information being required by the light receiving unit 20.

The wavelength swept and modulated current setting unit 113 can generate a light modulation signal for gas analysis and a light modulation signal for communication. For example, the light modulation signal for communication is a synchronizing signal for aligning phases in performing lock-in detection. The synchronizing signal may be a pulse-like intensity modulation signal, for example, and can cause the modulated light generation unit 11 and the light reception signal processing unit 21 to be synchronized with each other at the clock time at which a pulse is received.

When the concentration of the gas is detected by lock-in detection, if a measurement start timing is not synchronized between the modulated light generation unit 11 and the light reception signal processing unit 21, a phase shift is generated in the detected waveform. In view of the above, in the present embodiment, communication between the modulated light generation unit 11 and the light reception signal processing unit 21 is performed by superimposing a synchronizing signal on the laser light to align phases in place of using the conventional communication line 40. With such a configuration, it is possible to synchronize the measurement start timing between the modulated light generation unit 11 and the light reception signal processing unit 21 and hence, the generation of a phase shift can be suppressed.

Figure 5:
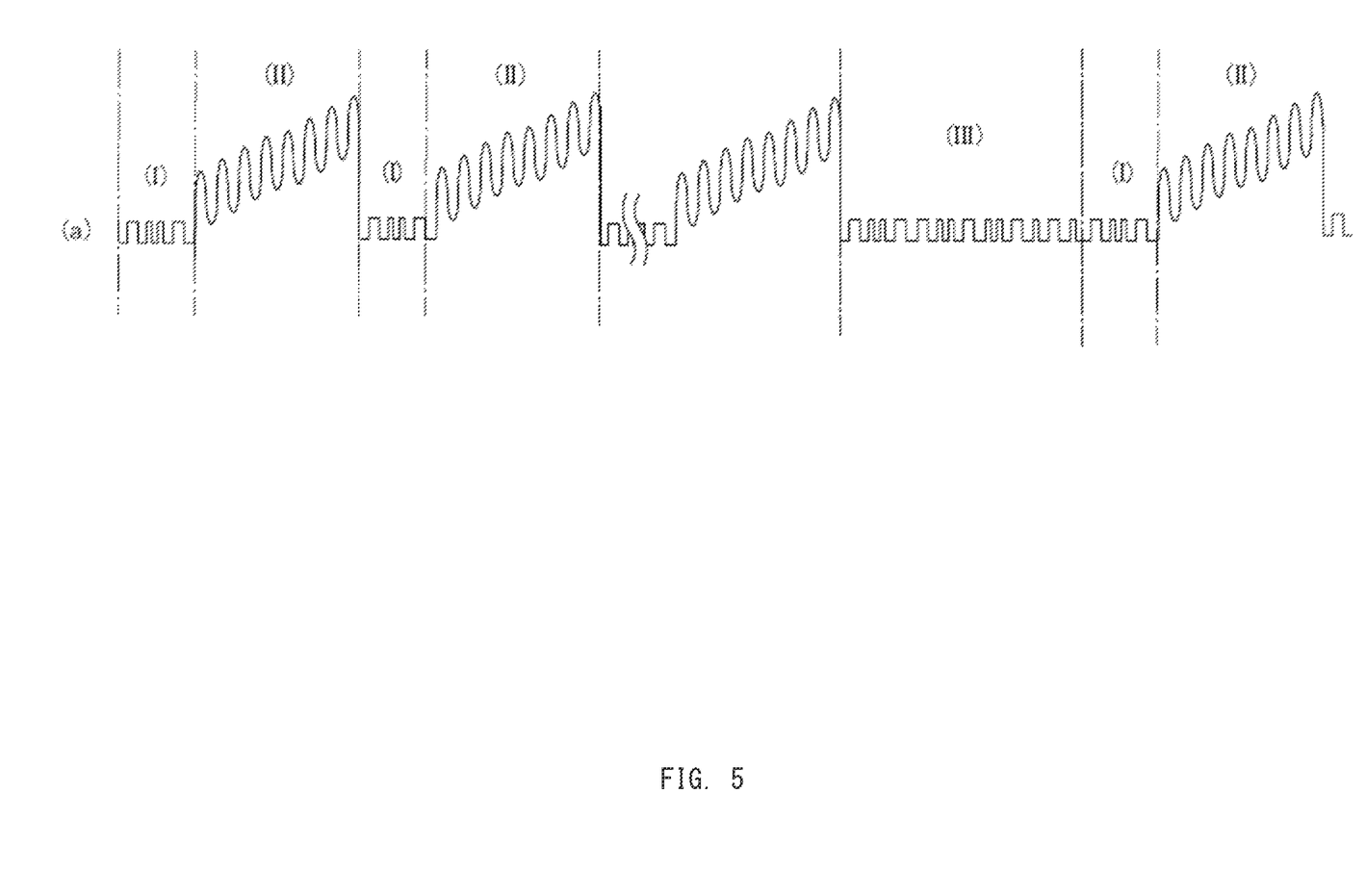
FIG. 5 is a diagram of the waveform of a drive current that includes a light modulation signal for gas analysis and a light modulation signal for communication.

FIG. 5 is a diagram of the waveform of a drive current generated by the wavelength swept and modulated current setting unit 113. A synchronization and measurement ID signal, in the form of a light modulation signal (first light modulation signal) (I) for communication, is provided prior to each light modulation signal (second light modulation signal) (II) for gas analysis. The light modulation signal (II) is a light modulation signal that sweeps a wavelength in a wavelength band that includes the light absorption wavelength of the absorption line spectrum of the gas to be measured.

A light modulation signal (III) shown in FIG. 5 is different from the light modulation signal (I), and is information on the light emitting unit 10, the information being required by the light receiving unit 20. Although not limited, the light modulation signal (III) may be information on characteristic change, such as laser element temperature information on the laser element 12, deterioration information, or information on the gas to be measured, for example.

The wavelength swept and modulated current setting unit 113 shown in FIG. 3 can generate a light modulation signal in the form of a digital signal. The light modulation signal is DA converted by the DA converter 114, and is transmitted to the laser element 12. In the present embodiment, the light modulation signals (I), (III) for communication and the light modulation signal (II) for gas analysis are superimposed on the laser light 30.

In the light receiving unit 20, the gas absorption measuring circuit 123 obtains a light modulation signal for gas analysis and a light modulation signal for communication from the detection signal outputted from the light receiving element 22 to synchronize a measurement start timing in the lock-in detection. With such a configuration, it is possible to correct the phase shift of the lock-in detection waveform in the gas absorption measuring circuit and hence, the concentration of the gas can be detected with high accuracy. Further, synchronization is performed by the light modulation signal (I) for each gas measurement and, thereafter, the concentration of the gas is detected by the light modulation signal (II) and hence, the concentration of the gas can be detected without generating a phase shift for each measurement. Accordingly, such a configuration is preferable.

When a synchronization and measurement ID signal generated by the wavelength swept and modulated current setting unit 113 is given as a simple single pulse, there is a possibility that the correct timing cannot be obtained in the case where the laser light 30 is interrupted by dust or the like. In view of the above, a plurality of pulse patterns are determined in advance, and only a measurement timing when the light emitting unit 10 and the light receiving unit 20 can correctly receive such a pattern is used for measuring concentration. With such a configuration, it is possible to stably measure the concentration.

For the pulse pattern, exactly the same pulse pattern may be used. However, such a case rests on a premise that measurement is continuously performed under the same condition. In the case where a plurality of gas components are measured, such as the case where a gas component to be measured is changed, to allow the light receiving unit 20 to identify which gas component is under measurement, pulse patterns are set such that the next pulse pattern can be predicted based on the pulse pattern received by the light receiving unit 20 from the light emitting unit 10. Such a configuration allows measurement to be performed under a plurality of conditions. The gas concentration arithmetic correction unit 124 is notified by the control unit 126 that the gas concentration arithmetic correction unit 124 should calculate the concentration of which component.

For example, when two patterns of 10001 and 10101 are provided as pulse patterns, measurement can be performed under two conditions. By adopting sequential numbers, such as 10001, 10010, and 10011, it is possible to predict a next pulse pattern.

FIG. 5 shows an example in which communication is performed with a pulse pattern, that is, communication is performed by intensity modulation. However, it is possible to use a general optical communication system that uses a single laser. It is also possible to use binary communication, such as Amplitude Shift Keying (ASK), Frequency Shift Keying (FSK), or Phase Shift Keying (PSK), or to use multi-value processing (QASK, QPSK, or the like) that uses amplitude or the like. In such a case, the demodulator/decoder 127 shown in FIG. 4 causes a signal to correspond. Alternatively, by introducing the mechanism of optical heterodyne detection to the light receiving unit 20, it is possible to cause a signal to correspond.

In the present embodiment, the light modulation signal (III) for communication between the light emitting unit and the light receiving unit is transmitted from the modulated light generation unit 11 to the light reception signal processing unit 21. It is possible to either periodically or non-periodically transmit the light modulation signal (III). However, it is preferable that communication be periodically performed between the light emitting unit 10 and the light receiving unit 20 to exchange set values or the like. In the present embodiment, concentration is detected a plurality of times by the light modulation signal (I) and the light modulation signal (II) and, thereafter, the light modulation signal (III) is periodically transmitted. At this point of operation, one-way communication is performed from the light emitting unit 10 to the light receiving unit 20. Accordingly, it is possible handle this case by a method where information that is required by the light receiving unit 20 is determined in advance, and the light emitting unit 10 periodically transmits (broadcasts) this information.

Further, as described above, it is anticipated that a pulse pattern is broken due to a disturbance factor, such as dust. Accordingly, by adding redundancy, such as checksum, it is possible to achieve communication with higher reliability.

To simultaneously achieve the above-mentioned function of measuring concentration and communication function, it is desirable that a low distortion DA converter 114 be provided between the modulated light generation unit 11 and the laser element 12. The conventional laser gas analyzer has the property that, by utilizing the fact that distortion is generated in optically modulated laser light due to absorption by the gas to be measured, concentration is detected by measuring a harmonic component (second harmonic in general) of a modulated frequency. For this reason, the conventional laser gas analyzer often uses a low distortion analog oscillator that oscillates at a specific frequency. Even when such an analog oscillator is used, intensity modulation (ASK) allows communication to be relatively easily performed by using a mixer and multiplexer (AND) or the like. In contrast, when communication is performed by modulation, such as PSK or FSK, or by multi-value processing, there is a concern that peripheral circuits become complicated, leading to an increase in circuit scale. In view of the above, in the present embodiment, a DA converter is used that has a low distortion factor well below the total harmonic distortion factor (approximately −90 to −80 dB) of the conventional low distortion analog oscillator and hence, the laser can be driven with a desired waveform while having low distortion modulation performance that is required to measure the concentration of the gas. Accordingly, it is possible to prevent an increase in scale of a circuit even for communication that includes multi-value processing between the light emitting unit 10 and the light receiving unit 20.

The laser gas analyzer of the present invention is optimal for measuring combustion exhaust gases or for controlling combustion for a boiler or refuse incineration, for example. In addition to the above, the laser gas analyzer of the present invention is also preferably used as an analyzer for analyzing gases used for iron and steel [blast furnaces, converter furnaces, heat treatment furnaces, sintering (pellet facility), coke furnaces], for storing and ripening fruit and vegetables, for biochemistry (microorganism) [fermentation], for air pollution [incinerators, flue gas desulfurization/denitrification], for exhaust gases from the internal combustion engine of automobiles, ships or the like (removal of a tester), for disaster prevention [detection of explosive gases, detection of toxic gases, analysis of combustion gases from new building materials], for growing plants, for chemical analysis [petroleum refining plants, petroleum chemical plants, gas generation plants], for the environment [ground-level concentration, concentration in tunnels, parking lots, building management], and for various experiments for physics and chemistry, for example.

REFERENCE SIGNS LIST 1 laser gas analyzer
2 laser gas analyzer
10 light emitting unit
11 modulated light generation unit
12 laser element
13 collimating lens
14 light emitting unit window plate
15 light emitting unit container
20 light receiving unit
21 light reception signal processing unit
22 light receiving element
23 condenser lens
24 light receiving unit window plate
25 light receiving unit container
30 laser light
40 communication line
50a, 50b wall
51a, 51b flange
52a, 52b optical axis adjustment flange
112 laser element temperature control circuit
113 wavelength swept and modulated current setting unit
114 DA converter
122 IV conversion circuit
123 gas absorption measuring circuit
124 gas concentration arithmetic correction unit
125 AD converter
126 control unit
127 demodulator/decoder

What is claimed is:

1. A laser gas analyzer for a gas analysis of a target gas in a target space, the laser gas analyzer comprising:
a light emitting unit including
a laser element configured to emit laser light having a target wavelength band including a wavelength of an absorption line spectrum of the target gas, and
a modulated light generation unit configured to supply a drive current to the laser element so that the laser element sweeps and modulates the laser light to have the target wavelength band; and
a light receiving unit including
a light receiving element configured to receive the laser light passing through the target space and output a detection signal, and
a light reception signal processing unit configured to analyze the target gas according to the detection signal output by the light receiving element, wherein
the modulated light generation unit is configured to superimpose on the laser light a synchronizing signal for a measurement start timing in the gas analysis,
the light receiving unit receives from the light emitting unit the laser light on which information of the target gas and the synchronizing signal are superimposed.

2. The laser gas analyzer according to claim 1, wherein the light emitting unit
generates, by the modulated light generation unit, a first light modulation signal having the synchronizing signal and a second light modulating signal having the information of the target gas which are respectively required by the light receiving unit,
superimposes the light modulation signals on the laser light, and
outputs a superimposed signal as the detection signal, and
the light reception signal processing unit obtains the first light modulation signal for the communication between the light emitting unit and the light receiving unit and the second light modulation signal for the gas analysis from the detection signal.

3. The laser gas analyzer according to claim 2, wherein the light emitting unit digital-analog converts the first and second light modulation signals, and superimposes the first and second light modulation signals on the laser light to generate the detection signal.

4. The laser gas analyzer according to claim 3, wherein the light reception signal processing unit analog-digital converts the detection signal from the light receiving element to obtain the first light modulation signal and the second light modulation signal.

* * * * *